United States Patent [19]

Lapeyre

[11] Patent Number: 4,781,304

[45] Date of Patent: Nov. 1, 1988

[54] MEANS AND METHODS OF SEALING LIDS ON CONTAINERS

[75] Inventor: James M. Lapeyre, New Orleans, La.

[73] Assignee: The Laitram Corporation, New Orleans, La.

[21] Appl. No.: 105,025

[22] Filed: Oct. 6, 1987

[51] Int. Cl.⁴ ............................................. B65D 17/48
[52] U.S. Cl. ...................................... 220/280; 220/67; 53/477
[58] Field of Search ................ 220/67, 279, 280, 359; 29/469.5, 526 R; 156/69, 273.9; 53/477

[56] References Cited

U.S. PATENT DOCUMENTS

| | | |
|---|---|---|
| 2,998,158 | 8/1961 | Tupper . |
| 3,799,389 | 3/1974 | Bloeck ................................ 220/279 |
| 3,799,389 | 3/1974 | Bloeck . |
| 4,044,941 | 8/1977 | Knudsen . |
| 4,406,860 | 9/1983 | Beauvais et al. . |
| 4,474,304 | 10/1984 | Jacobs . |
| 4,586,624 | 5/1986 | Shaw ................................... 220/359 |

Primary Examiner—George T. Hall
Attorney, Agent, or Firm—Laurence R. Brown

[57] ABSTRACT

Plastic portions of a container rim and mating lid are fused together by an electrical conductor wire loop positioned therebetween when electromagnetically coupled to an induction heating coil. The wire forms a tab extending outside the closed container which may be manually manipulated to remove a lid fused in place to close the container. This container may be hermetically sealed with sanitized foodstuff or the like by concurrently sterilizing with microwave energy while fusing the lid in place.

15 Claims, 2 Drawing Sheets

MEANS AND METHODS OF SEALING LIDS ON CONTAINERS

TECHNICAL FIELD

This invention relates to sealing of containers and more particularly it relates to the fusing of a lid to a container body by induction heating of a wire loop placed adjacent fusible container materials commonly meeting at mating lid and body surfaces.

BACKGROUND ART

Sealing lids on containers by melting container material onto a thin metal foil membrane closing the container is known in the art as evidenced by U.S. Pat. No. 4,004,941 issued to D. Knudsen Aug. 30, 1977. Several problems result. This, in effect two lids are required, increasing container costs particularly in view of the problems of handling and quality control imposed by the fragile nature of the film and the inefficiencies of induction heating the metal foil in areas other than those being fused. Also, the large area foil may interfere or be inconsistent with microwave sterilization of the contents inside the container, which need be passed through only transparent to electromagnetic energy package areas such as plastic sidewalls.

Sterilization of food in sealed containers, such as by microwave energy, has associated problems because of generation of steam and handling of pressure, such as treated in the U.S. Patents, as follows:

J. Lundy, U.S. Pat. No. 3,215,539, Nov. 2, 1965, requires sealing the food in a vapor tight package of constant volume before directing microwave energy thereinto.

M. Beauvais et al. U.S. Pat. No. 4,406,860, Sept. 27, 1983, encloses a container within an outer pressure control jar with a steam release valve when sterilizing with microwaves and thereafter during cooling, in order to vacuum pack the food by pressure sealing of a lid into place by internal vacuum pressure of the container when the outer jar is opened to the atmosphere.

Clearly the prior art does not provide an inexpensive hermetically sealable container in which food can be quickly, reliably and inexpensively sterilized while sealing the lid on the container.

Another problem with prior art sealed plastic containers is the eventual unsealing or removal of the lid, which has led to the awkward and complex molds required for unusual and complex opening means as exemplified, for example, by U.S. Pats. Nos. 2,998,158 to E. Tupper, Aug. 29, 1961; 3,799,389 to S. Bloeck, Mar. 26, 1974 and 4,474,304 to S. Jacobs, Oct. 2, 1984. Thus, in heat sealed plastic containers, plastic tear strips or inserted tear threads are provided conventionally to remove the plastic lid from the plastic container body to which it is sealed. However, the opening process is tedious and time consuming rather than a simple pop off of the lid.

Accordingly it is a generaly objective of this invention to improve the state of the art by resolving the foregoing problems with a simplified container and sealing method therefor. Other objects, features and advantages of the invention will be found throughout the following description, drawings and claims.

DISCLOSURE OF THE INVENTION

Thus, in accordance with this invention there is provided a container of the type having a lid sealed on by thermal fusing of thermoplastic material, such as a plastic container having a mating body and lid of fusible together thermoplastic material commonly meeting at the body rim. This container is sealed by inductive heating means from a coil outside the closed container and one adjacent the mating plastic fusible lid and body surfaces for fusing them together. The inner heater coil has a tab that extends outside the container and serves the dual purpose of being a pop off type lid removal tab, or in the alternative a tear wire for rupturing the plastic to release the lid.

Foodstuffs, or the like, are preferably sanitized by microwave energy concurrently applied while the lid is fused onto the body by electromagnetic induction. Thus steam is released and vacuum sealing occurs without entry of contaminating air with simplified non-critical equipment. The lid may be either tacked in place by partial fusing or may be hermetically sealed by complete air tight fusing about the entire rim of the container body and lid.

BRIEF DESCRIPTION OF THE DRAWINGS

In the various views of the drawing similar features are identified with like reference characters to facilitate comparison.

THE PREFERRED EMBODIMENTS

Figure 1:
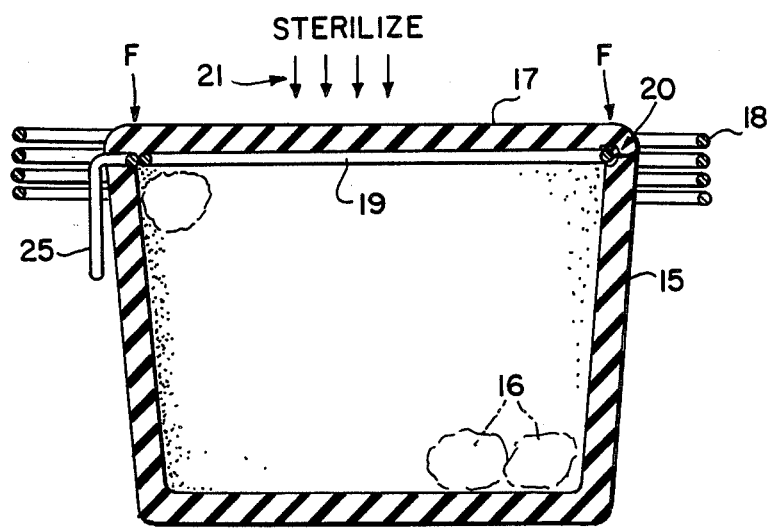
FIG. 1 shows in section view a novel container configuration loaded with foodstuff, or the like, in the sanitation and lid sealing process, as afforded by this invention.

It may be seen from FIG. 1 that a container body 15, containing foodstuff 16, or the like, has a sealed on lid 17, which is electromagnetically heated by means of primary induction heater coil 18 and secondary coil 19 implanted in a position within the closed container so that it may fuse together the thermoplastic lid and body rim portions as in the region of arrow 20 by induction heating. The force F on the lid assures good contact of mating lid and body surfaces while the fusing occurs and preferably is kept until the plastic is cooled enough to hold the lid securely in place.

The container may be hermetically sealed in this manner, or if that is not important, less heat can tack together the surfaces to hold the lid in place. If the contents, such as food, are to be sterilized, this is done as indicated by microwave radiation 21 passing through the container. Since steam is released from moisture in the food, the fusing is done after sufficient steam escapes from between the lid and container body. Alternatively, the sterilization can be accomplished under pressure to eliminate the generation of steam. Thus, sequentially the microwave sterilization energy is applied and thereafter at least partly concurrently the fusing induction energy is applied. This results in a hermetic vacuum seal without the introduction of contaminating air after sterilization or during the fusing operation.

Figure 3:
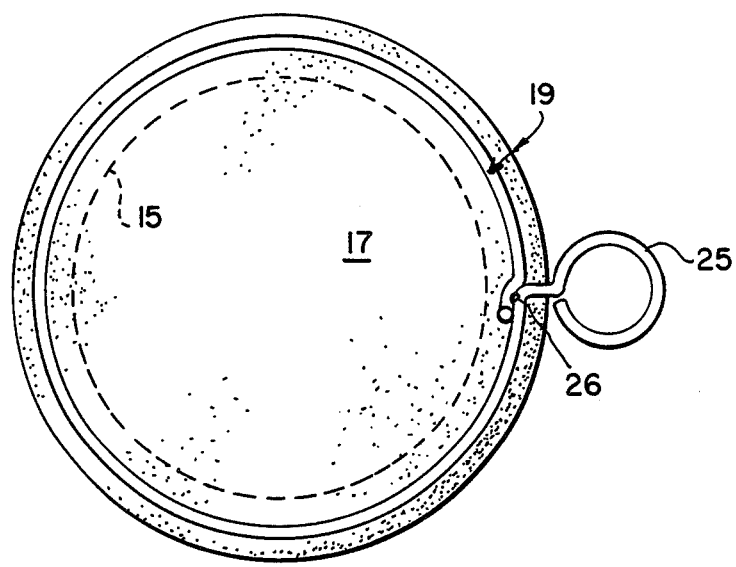
FIG. 3 is a top plan view of the container of FIG. 1 with its pull tab readied for removal of a sealed on lid.

The pull tab 25 extends from the inductive secondary coil 19 to a position outside the container for manual access is removing the lid 17 sealed onto the body portion 15 of the container, as seen from FIGS. 1 and 3. When the coil is of heavy, stiff wire such as steel, it provides a pop off action breaking the lid free at a rupture point that may be a weakened section of the lid or at a point adjacent the fused areas, for example. Should the coil be of a more ductile wire such as copper strands, then the tab 25 acts as a handle for a tear string of the prior art. For such cases, and where it is desirable to have a progressive rupture around the periphery of the lid, the coil may have one end soldered or tack welded in a break away joint at 26. Then when the tab, which for inductive reasons is perpendicularly disposed from the coil 19, is manually pulled to a parallel position as shown in FIG. 3, the weld or solder joint 26 may be broken to permit the rupture to remove the lid to proceed under manual upwardly directed pressure in a clockwise direction about the lid as shown in FIG. 3.

Figure 2:
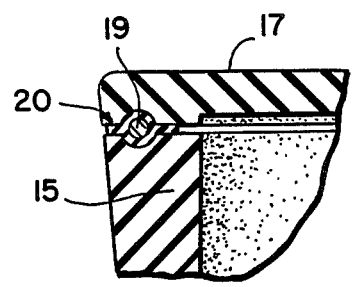
FIG. 2 is a fragmental section view of a particular container body to lid seal structure afforded by the invention.
Figure 4:
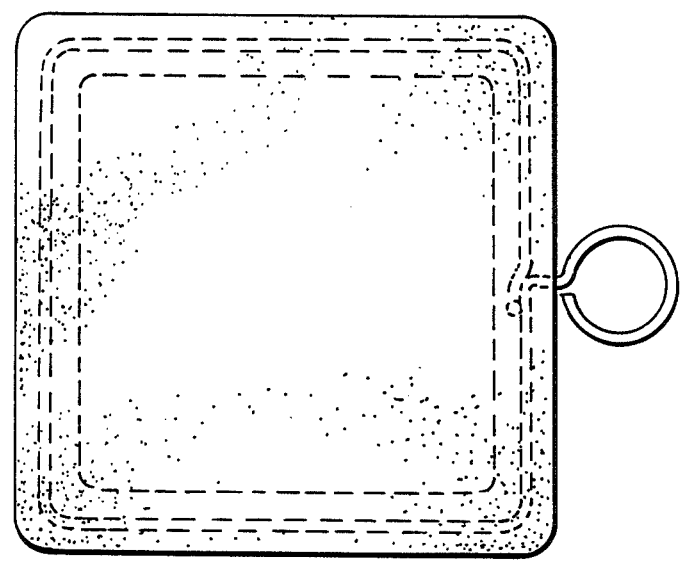
FIG. 4 is a top plan view of an alternative container configuration.

The coil 19 may be variously positioned to lie next to the desired fusing area or to be embedded between the lid 17 and container body 15 as shown in FIG. 2. Clearly the lid, the container body, and the meeting fusible surfaces may take various configurations. As shown in FIG. 4, a quadrilateral rather than conical container may be used in the same manner.

Having therefore advanced the state of the art by introduction of novel container structure and closure techniques, those features of novelty believed descriptive of the spirit and nature of the invention are defined with particularity in the following claims.

I claim:

1. A plastic container comprising in combination, a hollow body portion for receiving contents such as food being at least in part of a thermoplastic material, a mating lid portion adapted to close said body portion by contact with the thermoplastic material thereof to seal the contents inside the body being at least in part of a thermoplastic material that will mate with and fuse with the body thermoplastic material, a metallic wire body connected electrically to form a closed inductive coil circuit residing adjacent the body and lid portions in a position to heat and fuse the lid and body portions together in response to an externally applied induction field, and a pull tab formed by said wire body accessible from outside a closed container that in response to manual force will loosen a fused lid from the container.

2. The method of fastening lids to container bodies presenting a fusible thermoplastic substance for fusing the lid to the container body, comprising the steps of:
   positioning to heat the lid and container in the closed container condition a closed conductive loop which when electromagnetically associated with an inductor coil external to the container will generate sufficient heat to fuse the lid and container together, and
   electromagnetically inducing heat in said loop to fuse together the lid and container.

3. The method defined in claim 2 further comprising the steps of:
   providing on the loop a tab extending outside the container for manual access, and
   removing the lid when fused to the container by manual force on the tab rupturing the container material between the lid and container.

4. The method of claim 2 further comprising the steps of:
   loading foodstuff contained liquid into said container before fusing the lid in place,
   sterilizing the foodstuff in the container and fusing the lid in place with the electromagnetically induced heat with the sterilized foodstuff in place within the sealed container.

5. The method of claim 4 further comprising the step of:
   fusing the lid in place so as to provides a hermetical seal while sterilizing the foodstuff, thereby to prevent ingress of air and to seal the foodstuff in the container at a pressure below atmospheric.

6. The method of claim 2 further comprising the steps of:
   loading the container with contents that may be affected by the presence of moisture and air before fusing the lid in place, and
   hermetically fusing the lid in place with the electromagnetically induced heat.

7. A container having a body portion for holding a product and a lid for confining the product in the body portoin, comprising in combination,
   lid and body portions having placed at mating surfaces thereof an electrically insulating fusible material, and
   a closed electrically conductive loop of wire positioned to heat the fusible material when the lid is on the body portion as a secondary coil for electromagnetically inducing enough heat to fuse together the common surfaces by an external electromagnet induction coil when the lid is in place on the body portion.

8. A container as defined in claim 7 wherein the loop of wire has a tab extending outside the container when closed with the lid fused in place, said tab being adapted for manual manipulation to open a closed container with the lid fused in place.

9. A container as defined in claim 8 wherein the loop is formed of a stiff wire having an end conductivel fastened at a closing point on the loop from which the tab extends comprising a continued portion of the stiff wire formed into a plane perpendicular to that of the loop, thereby to use little electromagnetic energy when the loop is heated and further proving a tab that resides alongside the container body, which tab when used for opening the container is moved to a position substantially parallel with the loop thereby to bread the conductively fastened loop end away.

10. A container as defined in claim 8 wherein the lid is made of readily frangible material such as a foam plastic, and said loop wire is ductile and easily manually bent comprising an extending tab end manually accessible from outside a closed container with the lid fused in place, with the wire positioned to rupture the lid material when the tab is manually manipulated for opening a closed container when the lid fused in place.

11. A container as defined in claim 7 wherein the loop is resident in the lid before the common surfaces are fused together.

12. A container as defined in claim 7 with the lid fused in place to close the container by the application of induced electromagnetic energy to the loop.

13. A container as defined in claims 1 or 7 with the lid fused in place on the container to produce a hermetically sealed container.

14. A container as defined in claim 13 having sterilized contents with a liquid content hermetically sealed therein at a pressure below atmospheric.

15. A container as defined in claim 7 wherein the body of the container has a rim upon which the lid resides, and the loop comprises a single conductor wire positioned about the rim

* * * * *